US006225904B1

United States Patent
Jaffe et al.

(10) Patent No.: US 6,225,904 B1
(45) Date of Patent: May 1, 2001

(54) AUTOMATIC SLIDING DOOR SYSTEM FOR REFRIGERATOR UNIT

(75) Inventors: Lawrence Jaffe, Agoura Hills; John Riddle; Richard Becker, both of Camarillo, all of CA (US)

(73) Assignee: Refrigerator Manufacturers, Inc., Commerce, CA (US)

(*) Notice: Subject to any disclaimer, the term of this patent is extended or adjusted under 35 U.S.C. 154(b) by 0 days.

(21) Appl. No.: 09/408,111

(22) Filed: Sep. 29, 1999

(51) Int. Cl.$^7$ .................................................. G08B 13/08
(52) U.S. Cl. ................................ 340/545.6; 340/545.3; 340/555
(58) Field of Search ........................... 340/552, 555, 340/556, 557, 517, 521, 545.3, 825.22, 825.31, 545.6; 49/86.1, 90.1, 322, 449, 31, 28; 160/117, 118, 332, 344

(56) References Cited

U.S. PATENT DOCUMENTS

| | | | |
|---|---|---|---|
| 4,516,482 | * 5/1985 | Smith | 160/117 |
| 4,619,075 | 10/1986 | Wiles | 49/235 |
| 4,736,097 | 4/1988 | Philipp | 250/221 |
| 4,827,264 | 5/1989 | Bjelk | 342/61 |
| 4,961,454 | * 10/1990 | Reilly, Jr. et al. | 160/344 |
| 5,289,162 | * 2/1994 | McDaniel | 340/521 |
| 5,453,736 | * 9/1995 | Noren | 340/825.22 |
| 5,566,504 | * 10/1996 | Pitel | 49/28 |

FOREIGN PATENT DOCUMENTS 32 02 784 A1   8/1983  (DE).

OTHER PUBLICATIONS

"Jamison Cold Storage Doors—Cooler and Freezer Doors for food processing, warehousing and distribution facilities" REV 489, Jamison Door Company, Hagerstown, MD 21741–0070 (brochure—undated).

"Jamison—The Industry Leader In Cold Storage Doors" Jamison Door Company, 55 J.V. Jamison Drive, P.O. Box 70, Hagerstown, MD 21741–0070 (brochure—undated).

"BEA Wizard Door Sensing System Instruction Manual", B.E.A., Inc.300 South Main Street, Pittsburgh, PA 15215, USA (manual)(Aug. 1999).

"Edey Cold Storage Doors Since 1936" Edey Manufacturing Co., Inc., 2159 E. 92nd Street, Los Angeles, CA 90002 (brochure—undated).

"Edley Hydraulic Cold Storage Doors" Edey Manufacturing Company, 2159 E. 92nd Street, Los Angeles, CA 90002 (brochure—undated).

* cited by examiner

*Primary Examiner*—Van T. Trieu
(74) *Attorney, Agent, or Firm*—Lyon & Lyon LLP

(57) ABSTRACT

An automatic sliding door system especially well suited for use in walk-in freezer or refrigerator units includes an exterior sensor unit for detecting opening conditions on the exterior of a freezer or refrigerator unit, and an interior sensor unit for detecting opening conditions in the interior of the freezer or refrigerator unit. Each sensor unit comprises both a motion sensor and a presence detector. The motion sensor detects motion towards the sliding doors, and opens the doors as they are approached. Once motion is detected, the motion sensor tracks the motion no matter whether towards or away from the door, and keep the doors open so long as the motion is present. The presence detector of each sensor unit detects a change in the ambient conditions directly underneath the doorway, and keeps the door open when the ambient conditions change. The right and left side doors that are opened and closed simultaneously and in synchronism using a pulley mechanism connected to both the right and left side doors. A brushless DC servo motor is preferably employed to move the pulley and thereby open and close the doors. Optical sensors are deployed above one or both doors at selected locations so as to indicate deceleration and stopping points for the doors. Safety and security features include a manual push plate or pushbutton, a key lock on the exterior of the unit, and a multi-tier alarm system.

30 Claims, 12 Drawing Sheets

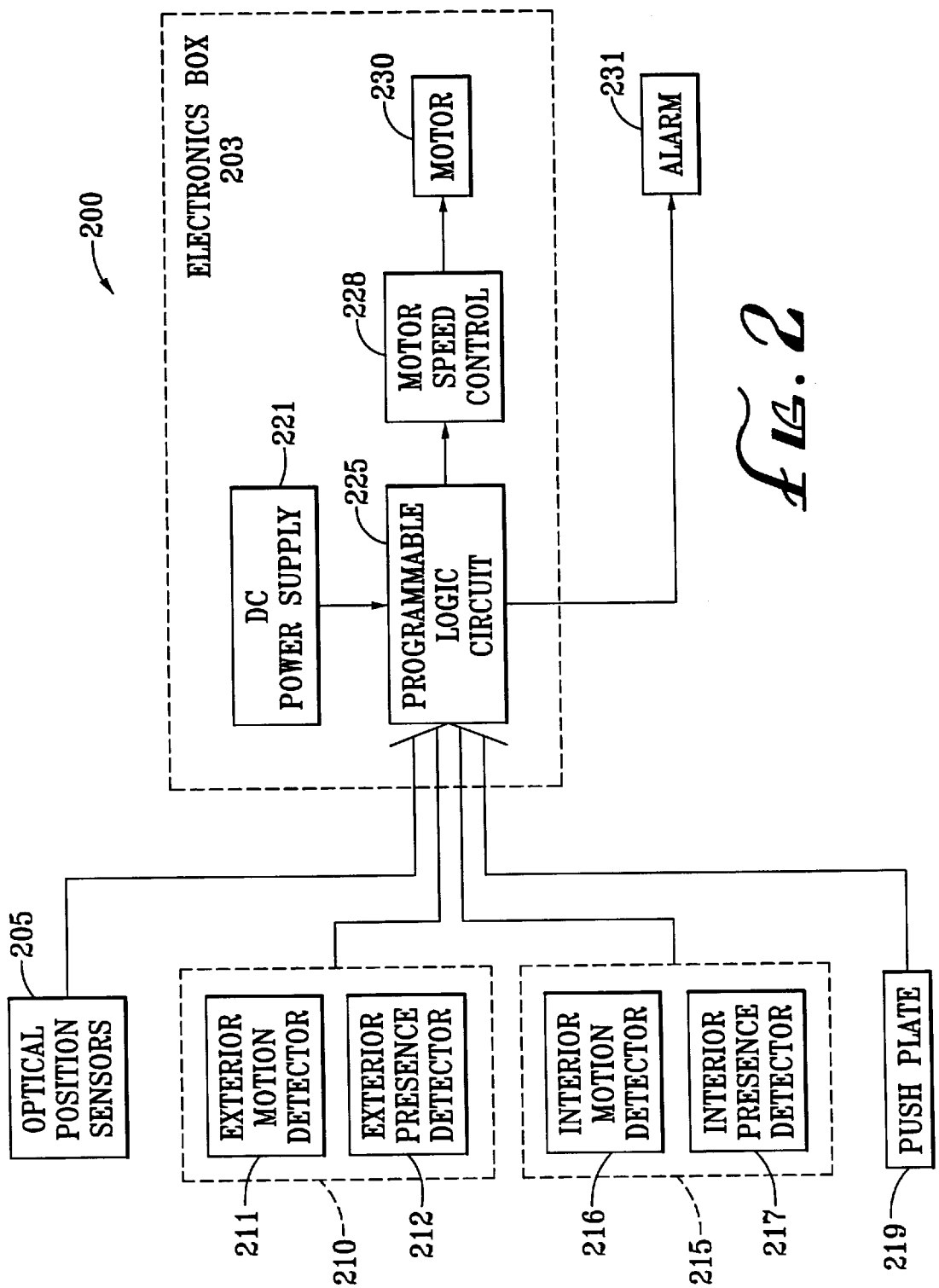

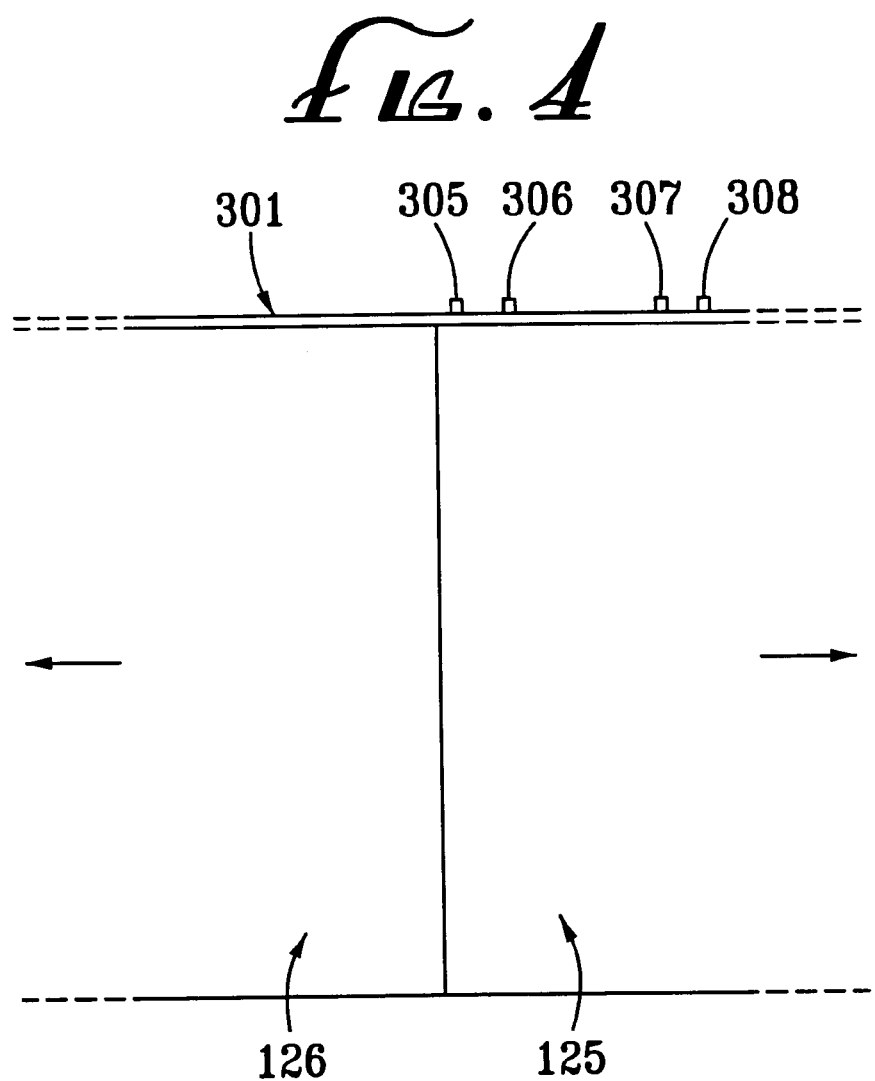

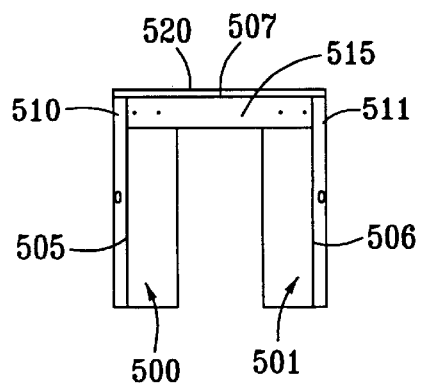
FIG. 10A
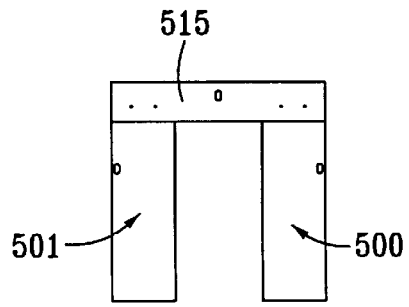
FIG. 10B
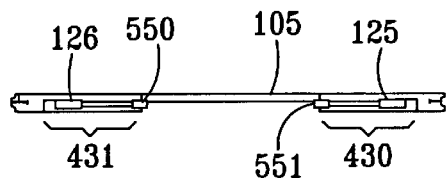
FIG. 11
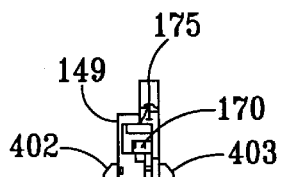
FIG. 12A
FIG. 12B
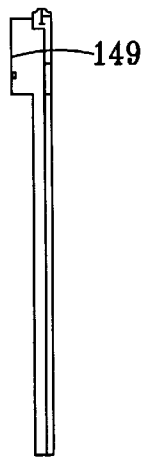
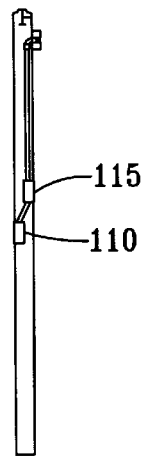
FIG. 12C

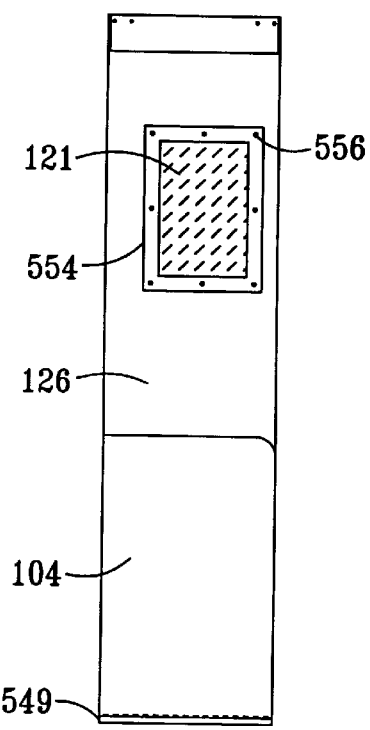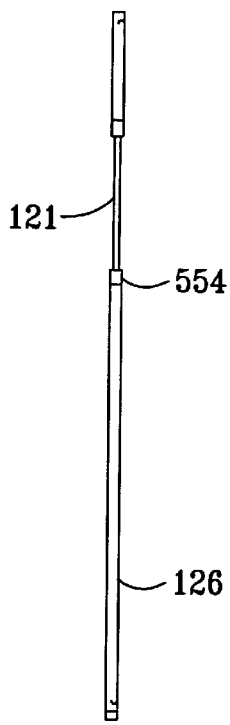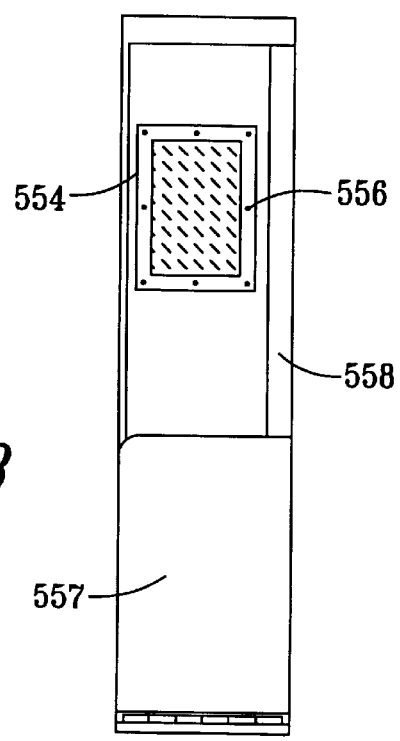

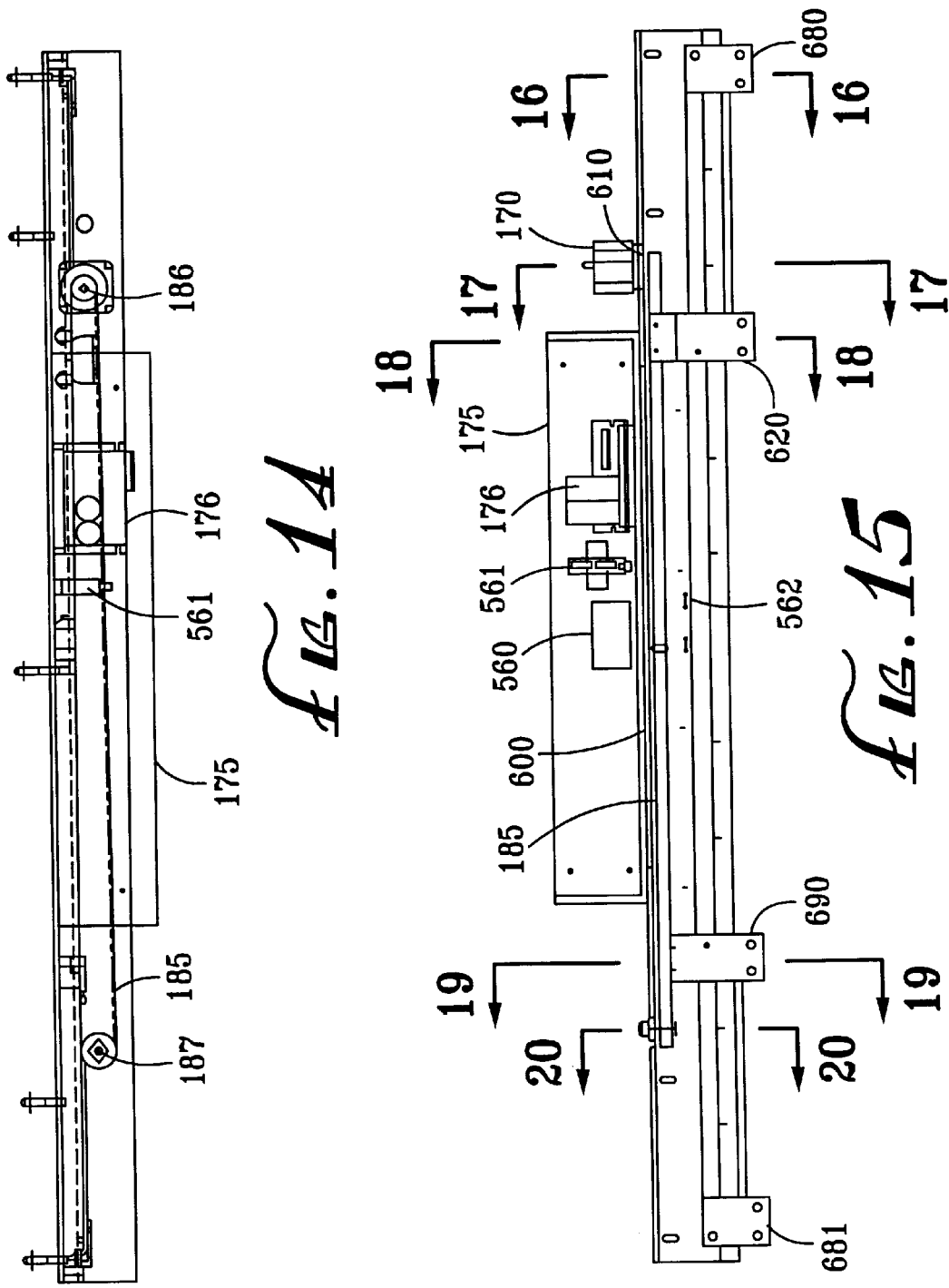

AUTOMATIC SLIDING DOOR SYSTEM FOR REFRIGERATOR UNIT

BACKGROUND OF THE INVENTION

1. Field of the Invention

The field of the present invention relates to an automatic sliding doors and control/security systems therefor, particularly well suited for use in walk-in freezer or refrigerator units.

2. Background

In the past, doors used on walk-in freezer and refrigerator units have often been swinging-type doors that need to be manually opened and closed. However, manual operation of freezer or refrigerator doors can be quite inconvenient, especially when there is a large amount of traffic passing into and out of the walk-in freezer or refrigerator unit, or when persons needing access to the walk-in freezer or refrigerator unit are laden with trays or other bulky items which need to be set aside to allow manual opening of the door, followed by the extra effort of re-lifting and balancing the trays or other bulky items.

Swinging-type doors can also be hazardous to persons in close proximity to the doors, when passers-through open the doors suddenly as they enter or exit the freezer or refrigerator unit. The swinging of the door can cause serious physical harm to persons, or knock trays of food or fragile items out of their hands.

Sliding doors have been designed for use in walk-in freezer or refrigerator units. Generally, such sliding doors have been motor-driven, but require manual activation, such as by pulling on a cord or pushing a button. Such manual operation of refrigerator or freezer sliding doors can be inconvenient to persons carrying items or pushing heavy carts. Further, particularly since refrigerator or freezer doors are often large, thick and heavy, the motors used to open and close such sliding doors are generally gear-driven or hydraulic in nature, and are prone to wear and tear.

Automatic swinging doors and sliding doors have been used in supermarkets and similar environments. Sensors are typically used in automatic door systems to assist the control electronics in determining when to start or stop opening the doors. Typically, a small mechanical switch known as a microswitch is employed to indicate the stopping point for the doors. The motor drive mechanism drives the doors past the microswitch which, when the door passes, physically switches, causing an output electrical signal indicating that the door is passing. When the controller receives the microswitch signal, it commands the motor drive to stop the motion of the door. Microswitches are generally mechanical in nature, and are required to be physically moved a slight distance (e.g., by the passing of the door) in order to produce an output signal. Being mechanical in nature, microswitches are prone to wear and tear, and deterioration over time.

Other means that have been used to control the opening and closing of automatic doors are proximity detectors. Proximity detectors are generally capacitive or inductive in nature, operating on the presence or absence of a magnetic field.

Designing doors for walk-in freezer and refrigerator units involve special challenges due to the effects of the cold environment on equipment and the door structure and components. Thus, sliding doors used in supermarket environments generally are not suitable for use in walk-in freezer or refrigerator units. Further, a wide variety of safety concerns exist in the walk-in freezer or refrigerator environment which are not present, or are less present, in the supermarket environment. For example, due care must be taken to avoid the possibility of persons being trapped inside a walk-in freezer or refrigerator unit due to failure or locking of the door mechanism.

There is a need for an automated door that is particularly well adapted for use in walk-in freezer or refrigerator units. There is further a need for such an automated door system that provides a high degree of safety for users, and prevents to a maximum degree obtainable the possibility that persons may become inadvertently trapped inside a walk-in freezer or refrigerator unit.

SUMMARY OF THE INVENTION

The invention provides in one aspect an automatic sliding door system especially well suited for use in walk-in freezer or refrigerator units. In one embodiment, an automatic sliding door system includes an exterior sensor unit for detecting opening conditions on the exterior of a walk-in freezer or refrigerator unit, and an interior sensor unit for detecting opening conditions in the interior of the walk-in freezer or refrigerator unit. Each sensor unit preferably comprises both a motion sensor and a presence detector. The motion sensor detects motion towards the sliding doors, and opens the doors as they are approached. Once motion is detected, the motion sensor is preferably operated so as to track the motion no matter whether towards or away from the door, and keep the doors open so long as the motion is present. The presence detector of each sensor unit detects a change in the ambient conditions directly underneath the doorway, and keeps the door open when the ambient conditions change. In one aspect, the presence detector provides a redundant backup in case the motion sensor fails.

In a preferred embodiment, the presence detector has an autolearn capability so that, as the environmental conditions change, the presence detector relearns the characteristic environmental conditions, and does not thereafter cause the opening of the sliding door unless those conditions change.

In another aspect of the embodiments described herein, a bi-parting door comprises right and left side doors that are opened and closed simultaneously and in synchronism using a pulley mechanism connected to both the right and left side doors. The right and left doors each preferably have grooved overhead roller wheels which are guided by a track. The pulley mechanism includes a pulley connected between two pulley wheels. The right side door connects to one side (e.g., the far side) of the pulley, while the left door connects to the other side (e.g., the near side) of the pulley. When the pulley turns one direction, the doors open, and when it turns the opposite direction, the doors close. A brushless DC servo motor is preferably employed to rotate one of the pulley wheels and thereby move the pulley for opening and closing the doors. Optical sensors are deployed above one door (or, alternatively, both doors) to provide positional information to a controller, which commands the motor to operate forward or backward in either a steady or decelerating manner. The optical detectors are positioned at selected locations so as to indicate deceleration and stopping points for the doors, whether opening or closing.

In a further aspect of various embodiments as described herein, special safety and security features are provided for an automatic sliding door system. A manual push plate or pushbutton located on the interior of the walk-in freezer or refrigerator unit allows manual override and egress should the interior sensor unit fail. A key lock on the exterior of the unit allows the system to be de-activated externally, while still operative internally, to prevent persons from being trapped inside the walk-in freezer or refrigerator unit. A multi-tier alarm system is provided, which includes different alarm levels based on different conditions.

Further enhancements, variations and modifications of the above illustrative embodiments are also described in more detail herein.

BRIEF DESCRIPTION OF THE DRAWINGS

FIG. 2 is a block diagram of an electronic sensing and control system for an automatic sliding door.

FIG. 4 is a front view diagram showing placement of optical sensors to monitor the position of the automatic sliding doors.

FIGS. 10A and 10B are simplified views from the front and back, respectively, of a door frame.

FIG. 11 is a top view of the door section of an automatic sliding door system.

FIGS. 12A–12C are different sectional views of one door frame member which is part of a door frame for a bi-parting, automatic sliding door.

FIGS. 13A–13C are diagrams of views from the front, side and rear, respectively, of one of one side door of a bi-parting, automatic sliding door.

FIG. 14 is a top view of a door mechanism frame with associated mounted components.

FIG. 15 is a front view diagram of the door mechanism frame with mounted components shown in FIG. 14.

DETAILED DESCRIPTION OF PREFERRED EMBODIMENTS

Figure 1:
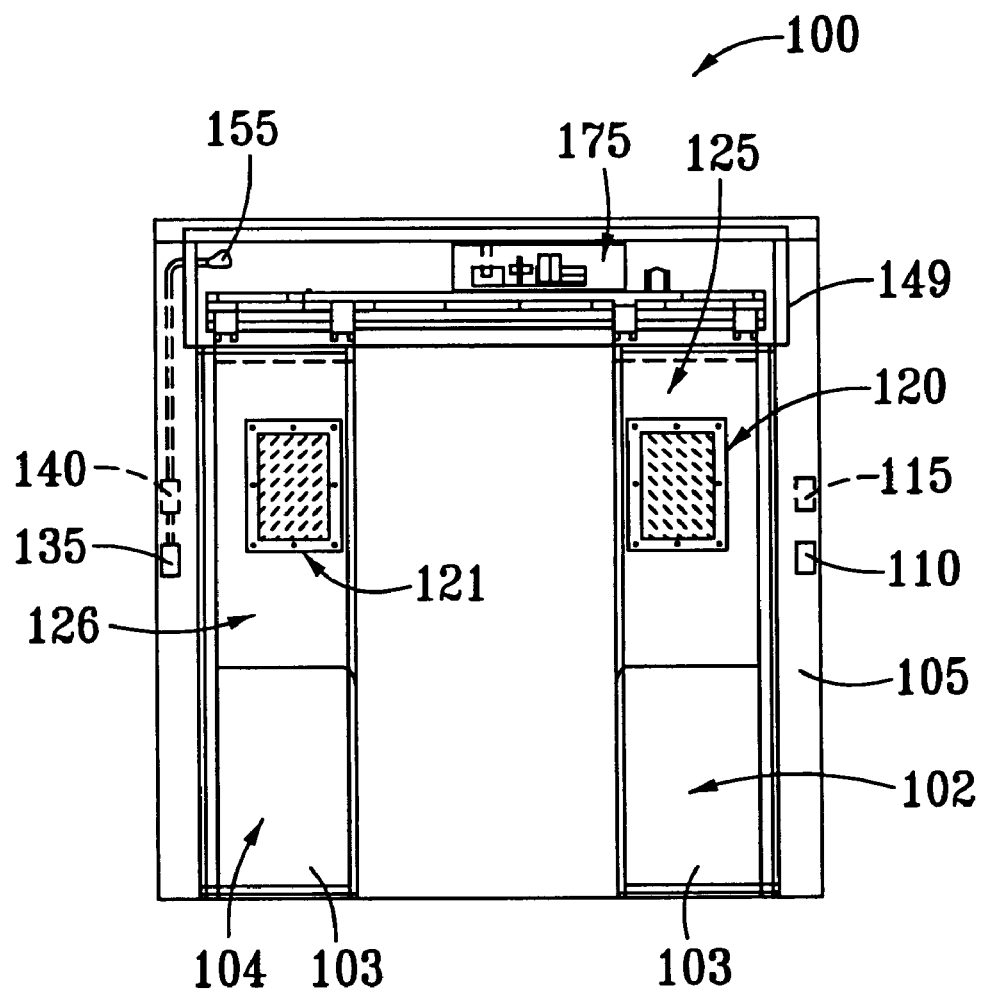
FIG. 1 is a front view diagram of one embodiment of an automatic sliding door system.

FIG. 1 is a front view diagram of a preferred embodiment of an automatic sliding door system 100. As illustrated in FIG. 1, an automatic sliding door system 100 comprises a bi-parting door 103 including a right door 125 and a left door 126, shown in the open position in FIG. 1. Surrounding the doors 125, 126 is a door frame 105, which may be constructed of 20-gauge stainless steel for outer plating, and insulated with several (e.g., four) inches thickness of urethane foam to prevent the coldness of the interior freezer or refrigeration region from penetrating to the exterior when the doors 125, 126 are closed.

FIGS. 10A and 10B are simplified views from the front and rear, respectively, of a door frame as may be utilized in the automatic door sliding system 100, while FIG. 11 is a top view of the door section in such an automatic sliding door system 100. As shown in FIGS. 10A and 10B, the door frame comprises a left frame member 500 and right frame member 501, connected by a top frame member 515 which acts as a cross-beam. On the exterior of the door frame, a left front frame outside face panel 510 and left front frame inside face panel 505 are positioned on the left side of the left frame member 500, while a right front frame outside face panel 511 and right front frame inside face panel 506 are positioned on the right side of the right frame member 501, as shown in FIG. 10A. A top front frame outside face panel 520 and top front frame inside face panel 507 are placed above the top frame member 515. In FIG. 11, doors 125, 126 are shown in a retracted (open) position, behind urethane-insulated right and left shield panels 430, 431, respectively. A magnetic gasket 551 on the inner sidewall of the right door 125 opposes a magnetic strip 550 on the inner sidewall of the left door 126, allowing the doors to stay snugly together when closed.

Figure 9:
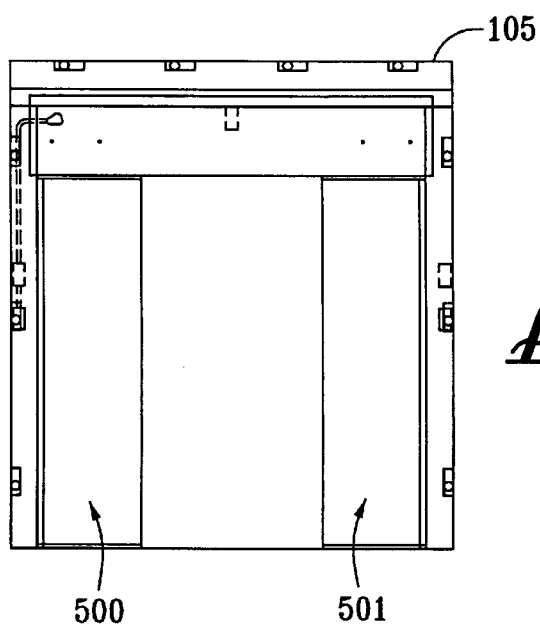
FIG. 9 is a diagram of an outer door frame for an automatic sliding door, showing dimensions for a preferred embodiment.

FIG. 9 is a more detailed diagram of a door frame 105 showing dimensions according to an exemplary embodiment as described herein; however, as explained later herein, the specific dimensions may depend upon the particular application to which the automatic door sliding system 100 is put, and the desired width of the doorway.

The doors 125, 126 are preferably opened and closed using a brushless DC servo motor, according to techniques described in more detail later herein. The brushless DC servo motor is controlled by a motor drive located within an electrical enclosure 175, along with various other electronic components which serve to control the bi-parting door 103 and associated features. Details of a preferred electronic enclosure 175 (without the shroud 149) are shown in more detail in FIG. 15, along with other features relating to the control and operation of the bi-parting door 103. As shown in FIG. 15, within the electronic enclosure 175 are a DC power supply 560, a programmable logic circuit 561, and a motor drive 176. The motor drive connects to the brushless DC servo motor 170. The electronic enclosure 175 is mounted atop a stainless steel door mechanism frame 600, and may also be fastened to the cross-beam of the outer door frame 105 (see FIG. 1). The door mechanism frame 600 itself is also fastened to the cross-beam of the outer door frame 105.

Returning to FIG. 1, the right door 125 and left door 126 each have windows 120 and 121, respectively. The windows 120, 121 are preferably multi-paned (e.g., dual-paned or triple-paned) and sealed with silicon RTV, so as to provide an appropriate level of insulation. The right door 125 and left door 126 may each be provided with a stainless steel kickplate 103 and 104, respectively. An exterior lightswitch 110 and illuminated interior lightswitch 115 are provided on the door frame 105 for turning on lights (not shown) within the interior of the walk-in freezer or refrigerator unit. An exterior door control key switch 135 is provided for controlling certain operations of the door, described hereinafter. An interior manual door open push plate 140 is provided on the interior of the door frame 105, to allow manual operation or override of the bi-parting door 103, as later described herein, should the sensing system fail.

Figure 7:
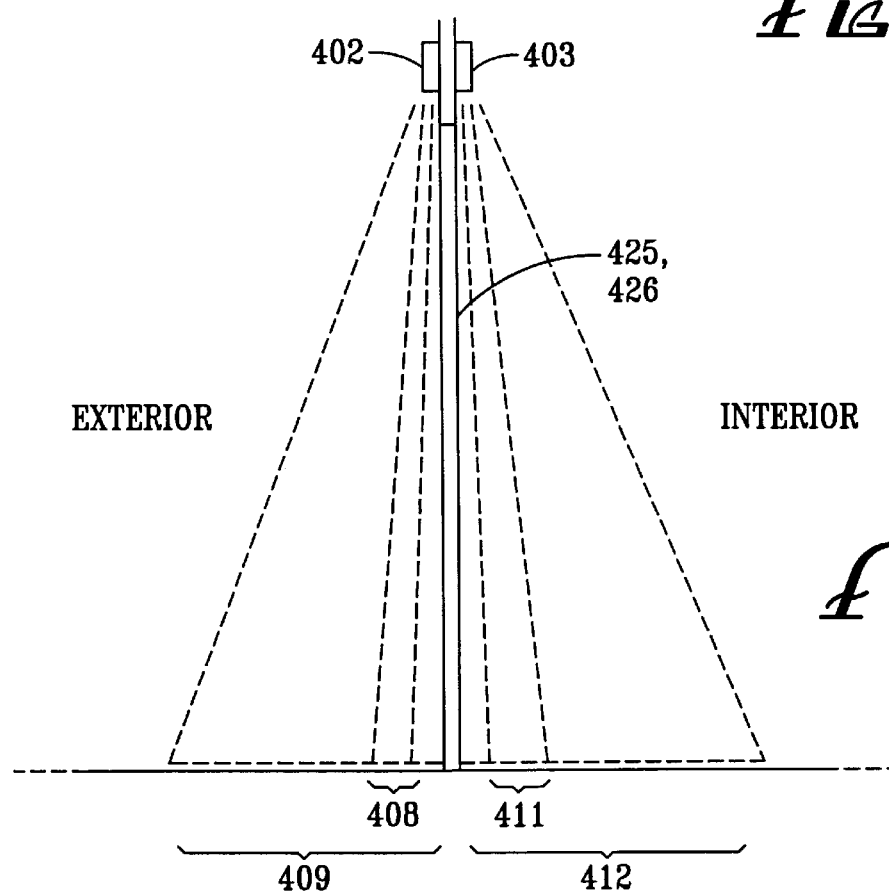
FIG. 7 is a side view diagram of an automatic sliding door system having an interior sensing system and an exterior system, each with both motion sensing and presence sensing capability.
Figure 8:
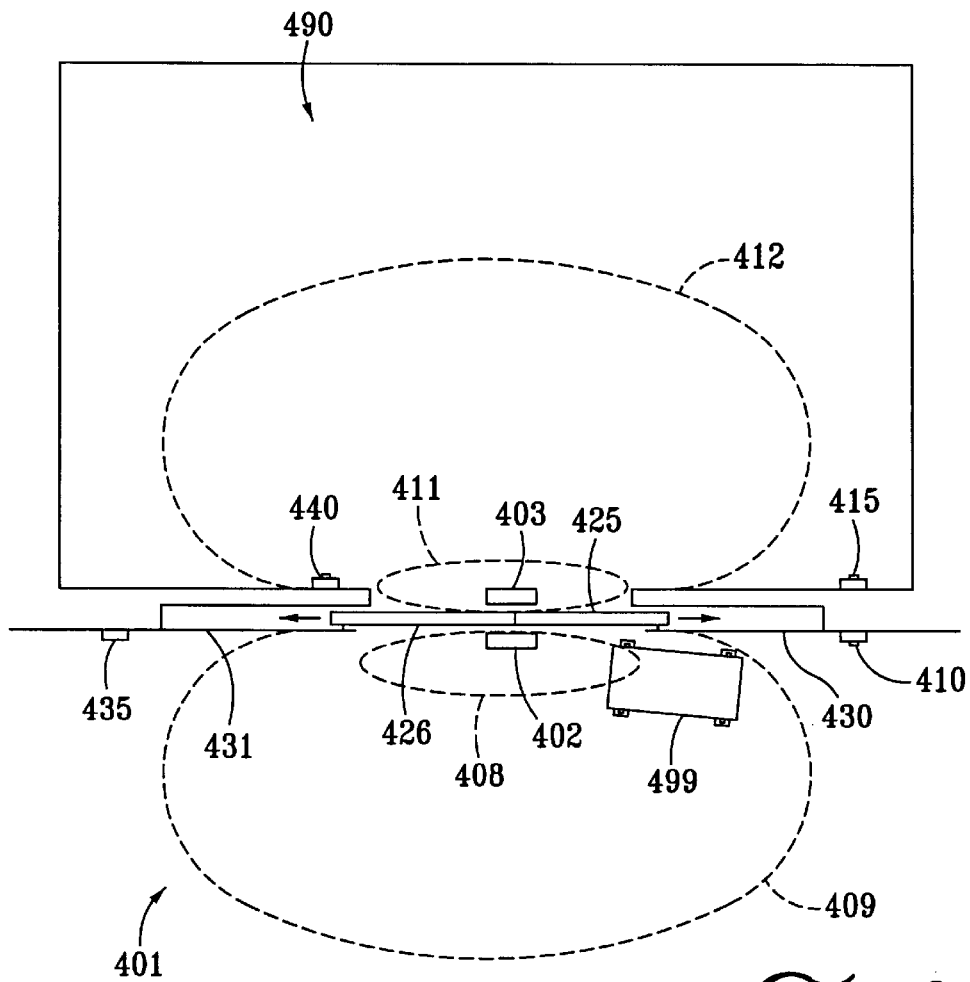
FIG. 8 is a top view diagram of an automatic sliding door system having an interior sensing system and an exterior system, each with both motion sensing and presence sensing capability.

A preferred automatic door sensing system 401, in accordance with certain features depicted in FIG. 1 and described above, is shown in FIGS. 7 and 8. FIG. 8 is a top view of the automatic door sensing system 401 with automatic bi-parting doors 425, 426 (such as doors 125, 126 shown in FIG. 1), while FIG. 7 is a side (cross-sectional) view of the bi-parting door illustrating certain sensor features of the automatic door sensing system 401. The automatic door sensing system 401 depicted in FIGS. 7 and 8 includes, among other things, an exterior sensing unit 402 and an interior sensing unit 403, that latter of which provides sensing functions primarily in the interior of a walk-in freezer or refrigerator unit 490. Each of the sensing units 402, 403 preferably comprises multiple sensors, which can include one or more of motion sensors, presence sensors, sound sensors, light sensors, heat sensors, or any others. In a preferred embodiment, each of the sensing units 402, 403 includes a motion sensor and a presence sensor. A presently preferred sensing unit 402 or 403 for the automatic sliding door system 401 is the Wizard Sliding Door Sensing System manufactured by B.E.A., Inc. of Pittsburgh, Pa.

Figure 5A:
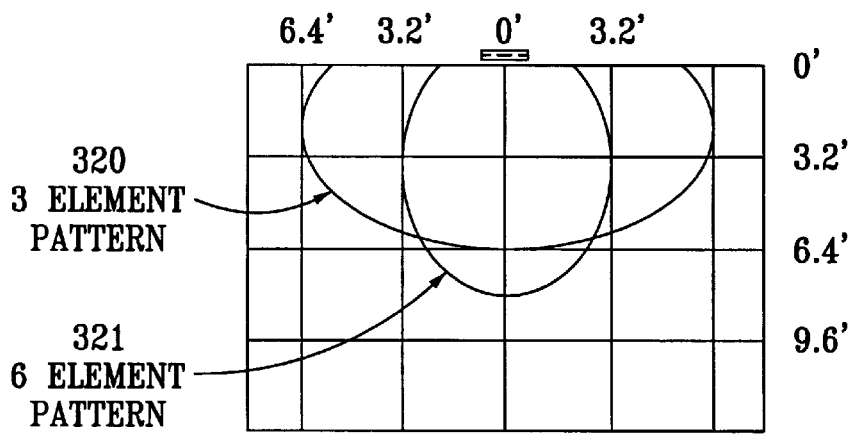
FIG. 5A is a top view diagram illustrating possible motion sensor detection patterns.
Figure 5B:
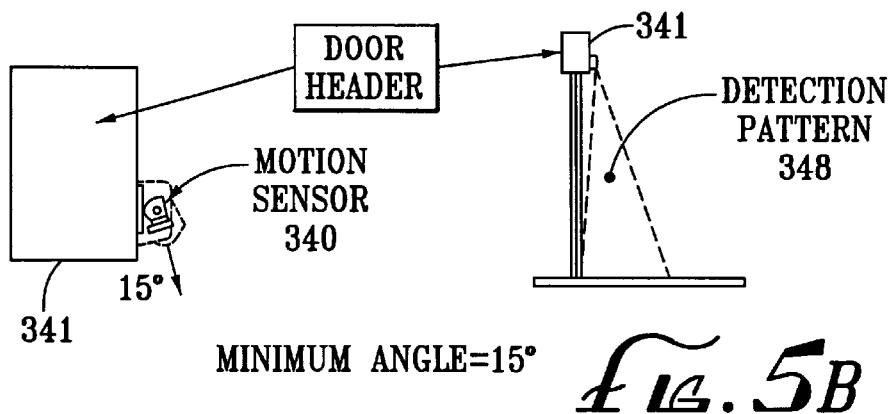
FIGS. 5B and 5C are side view diagrams illustrating the motion sensor detection patterns of FIG. 5A from a side view, for two different angles of the motion sensor.
Figure 5C:
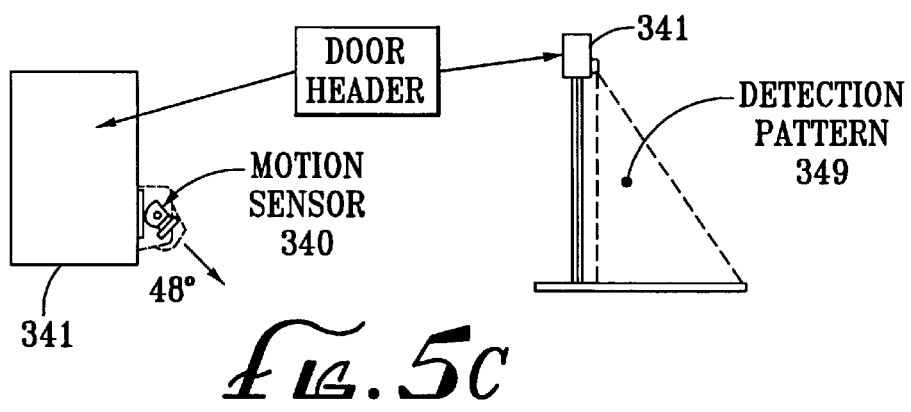

To better understand the functioning of the motion sensor and presence sensor of sensing units 402 and 403, reference may be had to FIGS. 5A–5C, which depict various aspects of detection patterns for a motion sensor 340. The motion sensor 340 essentially comprises a doppler radar and antenna, which collectively detect motion towards or away from the door over which the motion sensor 340 is placed. The motion sensor 340 is configured with different antenna options providing for a wide detection field or a narrow detection field for motion sensing. In particular, a 3-element antenna (not shown) is provided to obtain a wide detection field 320, and a 6-element antenna (not shown) is provided to obtain a narrow detection field 321. As shown in FIG. 5A, the detection field 320 for the 3-element antenna is nearly circular in shape slightly over six feet long, while the detection field 321 for the 6-element antenna is not quite as wide but is approximately twice as long. Various other detection field patterns can be obtained in a manner well known to those skilled in the art; for example, by varying the number of antenna elements, or the size, shape and arrangement of the antenna elements.

The motion sensor 340 is attached to a door header 341, and is mounted in a swiveling fashion to allow it to vary between angles of 15° and 48°. FIG. 5B illustrates the resulting detection pattern 348 for the situation in which the motion sensor 340 is mounted at a 15° angle with respect to the door frame. FIG. 5C, on the other hand, illustrates the resulting detection pattern 349 for the situation in which the motion sensor 340 is mounted at a 48° angle. The particular angle selected for the motion sensor 340 in the sensing units 402, 403 of the automatic sliding door system 401 shown in FIGS. 7 and 8 depends in part upon the expected usage and type of traffic. For example, if it is expected that only persons will be entering and exiting through the sliding doors 425, 426, then an angle of 20° may be selected. If, on the other hand, it is expected that carts may also be entering and exiting through the sliding doors 425, 426, then a larger angle may be selected so as to provide earlier detection.

Figure 6A:
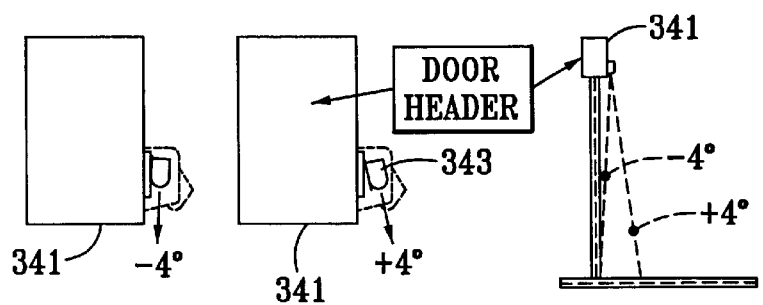
FIG. 6A is a side view diagram illustrating possible angles for a presence sensor.
Figure 6B:
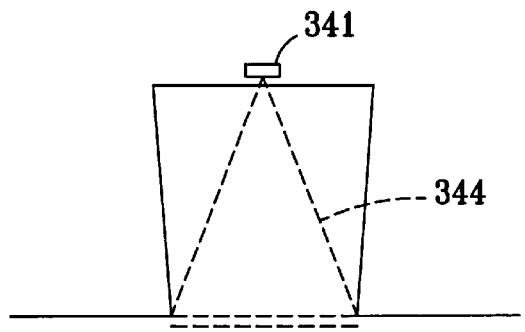
FIG. 6B is a diagram illustrating a presence detection grid pattern.

Features of the presence detector 343 included with the sensing unit are shown in FIGS. 6A and 6B. The presence detector 343, as previously noted, is preferably contained within the same sensor unit 402, 403 as the motion sensor 340. The presence detector 343 preferably comprises an infrared (IR) pattern generator (comprising, for example, several IR light-emitting diodes (LEDs)) and IR sensor (physically realized as a set of IR sensitive elements) which sends out a grid-like pattern of infrared energy, and continuously measures the reflectivity using the IR sensor. FIG. 6B is a diagram illustrating an exemplary presence detection grid pattern 344. The presence detector 343 may be adjustable to provide patterns for different door widths. As shown in FIG. 6A, the angle of the IR pattern generator and sensor for the presence detector 343 can vary between ±4°. The angle may be adjusted according to the particular system needs and requirements, but in a typical environment may be set, for example, so that the IR grid hits the floor approximately 18" from the doorway, so that persons present are detected prior to reaching the doorway.

In a preferred embodiment, the presence detector 343 has an "autolearn" capability by which it first "memorizes" the reflectively pattern within its sensing field, and then operates to open the sliding door when the reflectivity pattern later changes, indicating the presence of a person or object being moved in the vicinity of the presence detector 343. At initialization, and each time the door opens thereafter, the presence detector 343 activates one or more of the IR LEDs in various combinations, and measures and memorizes the reflectivity at each setting. The autolearn process may take several seconds (e.g., 10 seconds). The presence detector 343 thereafter continuously activates the IR LEDs in a predetermined pattern and monitors the reflectivity in the area. When the current reflectivity pattern does not match the learned pattern, the presence detector 343 opens the sliding door or, if open already, keeps it open. After continuously detecting an obstruction for a programmable time period (which may be up to, e.g., 20 minutes, but is expected to be on the order of seconds to prevent too much cold air from escaping), the reflecting pattern is relearned, and the sliding door is closed.

Examples of operation of the motion sensor 340 and the presence detector 343 of sensor units 402, 403 may be described with reference once again to FIGS. 7 and 8. FIG. 7 illustrates the overlapping nature of the exterior motion sensor field 409 and exterior presence detector grid 408, as well the overlapping nature of the interior motion sensor field 412 and the interior presence detector grid 411. In a preferred mode of operation, the motion sensor 340 and presence detector 343 are active at all times, not just, for example, when the doors 425, 426 are fully opened. Thus, redundancy is provided in that, should the motion sensor 340 fail for some reason, the presence detector 343 will still operate to open the doors 425, 426 when a person moves into the presence detection grid 408 or 411.

In a preferred embodiment, the motion sensor 340 can selectively be operated in one of a plurality of modes, in particular, either a unidirectional mode, a bidirectional mode, or a unidirectional mode with motion tracking. In the unidirectional mode, the motion sensor 340 detects motion approaching it (i.e., approaching the doors 425, 426), but ignores motion going away from the it (i.e., away from the doors 425, 426). In the bidirectional mode, the motion sensor 340 detects motion either approaching or moving away from the doors 425, 426. In the unidirectional mode with motion tracking, the motion sensor 340 normally operates in the unidirectional mode. However, once a person is sensed, the motion sensor 340 causes the doors 425, 426 to open, the motion sensor 340 switches to bidirectional mode and keeps the doors 425, 426 open for as long as the person remains in the motion sensor field 409 or 412 (depending on whether the motion sensor 340 of sensor unit 402 or 403 is involved). Once the person leaves the motion sensor field 409 or 412, the motion sensor 340 reverts back to unidirectional mode.

In typical operation, it is expected that the motion sensor 340 would be placed in either unidirectional mode, or unidirectional mode with motion tracking. The general assumption is that the owner or operator would want the doors 425, 426 open only when persons are moving towards the doors 425, 426, not when moving away therefrom. When a person approach the doors 425, 426, the motion sensor 340 of exterior sensor unit 402 detects the person when he or she enters the motion sensor field 409. The exterior sensor unit 402 then relays that information to the controller 225 (as described with respect to FIG. 2 hereinafter), which energizes the motor 230 and causes the doors 425, 426 to open. Assuming the motion sensor 340 of the exterior sensor unit 402 is in unidirection mode with motion tracking, the motion sensor 340 then switches to bidirectional mode. So long as the motion sensor 340 of exterior sensor unit 402 detects motion within its motion sensor field 409, it will keep doors 425, 426 open. If the person enters the freezer or refrigerator unit 490, the motion sensor 340 of the exterior sensor unit 402 will cease to detect the motion caused by that person, and no longer attempt to keep doors 425, 426 open.

Once the person passes through the doors 425, 426, the motion sensor 340 of the interior sensor unit 403 will not detect the person so long as the person is moving away from the doors 425, 426 (unless the motion sensor 340 is programmed initially in bidirectional mode, which is an available option). During that time, since the person is not being detected, the doors 425, 426 may close if the preprogrammed hold-open time period times out. However, when the person has finished his or her tasks within the walk-in freezer or refrigerator unit 490 (such as storing or retrieving food carts, trays or other items) and proceeds towards the doors 425, 426, the motion sensor 340 of the interior sensor unit 403 detects the motion and will, as with the exterior sensor unit 402, relay that information to the controller (i.e., programmable logic circuit 225, as described with respect to FIG. 2 hereinafter), which energizes the motor 230 and causes the doors 425, 426 to open. Assuming the motion sensor 340 of the interior sensor unit 403 is in unidirection mode with motion tracking, the motion sensor 340 then switches to bidirectional mode. So long as the motion sensor 340 of interior sensor unit 403 detects motion within its motion sensor field 412, it will keep doors 425, 426 open. Once the person exits the walk-in freezer or refrigerator unit 490, the motion sensor 340 of the interior sensor unit 403 will cease to detect the motion caused by that person, and no longer attempt to keep doors 425, 426 open.

When the person exits the walk-in freezer or refrigerator unit 490, typically the person will proceed directly away from the doors 425, 426. Assuming the motion sensor 340 of the exterior sensor unit 402 is in unidirectional mode with motion tracking, and assuming that the doors 425, 426 were closed at some point while the person was inside the walk-in freezer or refrigerator unit 490, the motion sensor 340 of the exterior sensor unit 402 will fail to detect the motion of the person exiting, and will not attempt to keep the doors 425, 426 open due to such motion. The doors 425, 426 will therefore close after the pre-programmed hold-open time period expires. It should be noted that the pre-programmed hold-open time period associated with the exterior sensor unit 402 and the pre-programmed hold-open time period associated with the interior sensor unit 403 may, if desired, be separately programmed to different values.

The motion sensing capability of the two sensor units 402, 403 thereby provides a particularly advantageous arrangement for allowing ingress to and egress from a walk-in freezer or refrigerator unit 490.

At the same time as the motion sensor 340 of either sensor unit 402, 403 is operating to provide detection of persons approaching the doors 425, 426, the presence detector 343 of either sensor unit 402, 403 is also continuously detecting the presence of persons or objects close to the doors 425, 426. So long as a person, for example, is in the doorway of doors 425, 426, the presence sensor 343 will detect the person and prevent the doors 425, 426 from closing, even if the person is motionless. The presence sensor 343 in each of the sensor units 402, 403 therefore provides a useful safety feature. Further, if the motion sensor 340 in either sensor unit 402, 403 fails, then a person can still enter or exit the walk-in freezer or refrigerator unit 490 by standing close to the doors 425, 426, within the presence detection grid 408 or 411 of the presence detector 343.

The "autoleam" capability of the presence detector 343 prevents the doors 425, 426 from remaining open due to placement of an inanimate object near the doors 425, 426, within the presence detection grid 408 or 411. For example, as illustrated in FIG. 8, if a cart 499 is moved within the presence detection grid 408, the presence detector 343 of the exterior sensor unit 402 will detect the cart 499 (due to the change in the reflectivity characteristics within the presence detection grid 408) and cause the doors 425, 426 to open, or to remain so if already open. After a preset autolearning delay period (programmable in one embodiment from 30 seconds to 20 minutes, e.g.), the exterior sensing unit 402 will "relearn" the characteristic reflectivity of the region within the presence detection grid 408 using its autolearn capability, which takes, as noted, several seconds. Afterwards, the cart 499 is, in essence, viewed by the presence detector 343 of the exterior sensor unit 402 as part of the natural environment. After the preset autolearning delay period and the autolearning performed by the presence detector 343, the exterior sensor unit 402 will allow the doors 425, 426 to close. Thereafter, the presence detector 343 of the exterior sensor unit 402 will only cause the doors to open 425, 426 if a new presence (i.e., change in reflectivity) is detected within the presence detection grid 408—including if the cart 499 is moved out of the presence detection grid 408, which would cause a change again in the reflectivity characteristics of the presence detection grid 408. Of course, the motion sensor 340 of the exterior sensor unit 402 would be operating simultaneously, and could cause the doors 425, 426 to open or remain open despite what is being detected by the presence detector 343 of the exterior sensor unit 402.

An advantage of utilizing a presence detector 343 with autolearn capability is that objects can be placed near the doors 425, 426 with the intent to keep them there indefinitely, yet within a short period of time the presence detector 343 will view the object(s) as a part of the natural environment. Thus, there is no need to manually re-initialize the presence detector 343.

FIG. 2 is a block diagram of a preferred electronic sensing and control system 200 for an automatic sliding door system as shown, for example, in FIG. 4. The electronic sensing and control system 200 receives sensor inputs from exterior sensing unit 210 and interior sensing unit 215, each of which comprise a motion sensor 211 and 216, respectively, and a presence detector 212 and 217, respectively. Whenever any of the motion sensors 211, 216 or presence detectors 212, 217 detect a person or object according to their normal operation as described above, an indication of such detection is provided in the form of an electrical input signal to a controller 225, which preferably comprises a programmable logic circuit (PLC) but may take the form of any suitable hardware-based or software-based electronic controller, including, for example, a microprocessor with related support circuitry, a finite state machine, a field-programmable gate array (FPGA) or an application-specific integrated circuit (ASIC). In response to receiving an indication that a person or object has been detected, the controller 225 will open the doors 425, 426 by energizing the door motor 230 for a suitable period of time, via a motor speed control block 228. A manual push plate 219 also provides an electrical signal input to the controller 225, and will cause the controller 225 to activate the door motor 223 to open the doors 425, 426. Under certain conditions, which are described in more detail elsewhere herein, the controller 225 will issue an alarm signal by sending an appropriate electrical output signal to an alarm unit 231.

Control of the door motor 230 by the controller 225 depends in part on the nature of the door motor 230 used to open and shut the doors 425, 426. Various possible options exist for providing automated operation of the doors 425, 426. For example, individual motors may be provided for each of the two doors 425, 426, and the controller 225 could activate the individual motors in synchronization to open and close the doors 425, 426. Other alternative mechanisms for opening and closing the doors 425, 426 would also be workable.

Figure 3A:
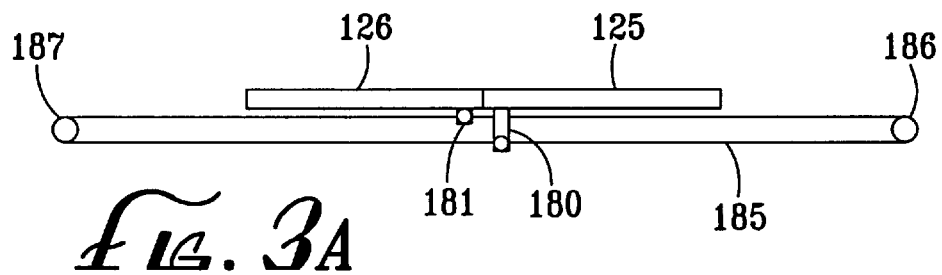
FIGS. 3A–3D are top view diagrams illustrating operation of a pulley to open and close automatic sliding doors.

In a preferred embodiment, the door motor 230 comprises a brushless DC servo motor, which is connected to a pulley mechanism is used for allowing both doors 425, 426 to open and close synchronously, such that the controller 225 only needs to control a single door motor 230. A simplified top-view diagram of such a pulley mechanism and its operation is depicted in FIGS. 3A–3D, which is described with reference to the automatic sliding door system of FIG. 1, but applies equally to embodiments constructed in accordance with the automatic sliding door system 401 of FIGS. 7 and 8. In FIG. 3A, doors 125 and 126 are shown in top view, in the closed position. A pulley 185 (or belt or other type of flexible member) above the doors 125, 126 is wrapped around two pulley wheels 186, 187 positioned at opposite ends of the pulley 185. The pulley 185 may be constructed of polyurethane with steel cable reinforcement, with a nylon facing to reduce noise. A right-door roller bracket 180 is fastened to the right door 125 and the far side of the pulley 185. A left-door roller bracket 181, shorter in length than the right-door roller bracket 180, is fastened to the left door 126 and the near side of the pulley 185.

The door motor 230 (not shown in FIG. 3A, but shown in mechanical form as motor 170 in, for example, FIGS. 12A, 15 and 17) is positioned over one of the pulley wheels 186, 187 (e.g., the right-side pulley wheel 186) and couples to the pulley wheel 186 with a rotatable central flange. When the door motor 230 is energized, the pulley wheel 186 is caused to rotate, which in turn moves the pulley 185. To open the doors 125, 126, the pulley 185 is moved in a counter-clockwise direction; conversely, to close the doors 125, 126, the pulley 185 is moved in a clockwise direction. Movement of the pulley 185 causes both doors 125, 126 to move simultaneously. As the pulley 185 moves counter-clockwise, the right-door roller bracket 180 forces motion of the right door 125 to the right, while the left-door roller bracket 181 forces motion of the left door 126 to the left. Thus, a single door motor 230 can cause opening or closing of both doors 125, 126 simultaneously.

Figure 3B:
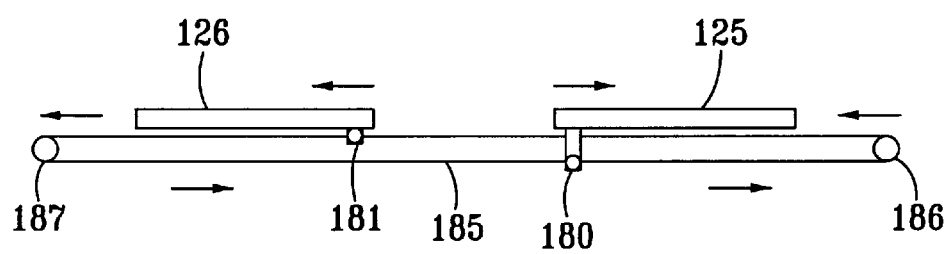
Figure 3C:
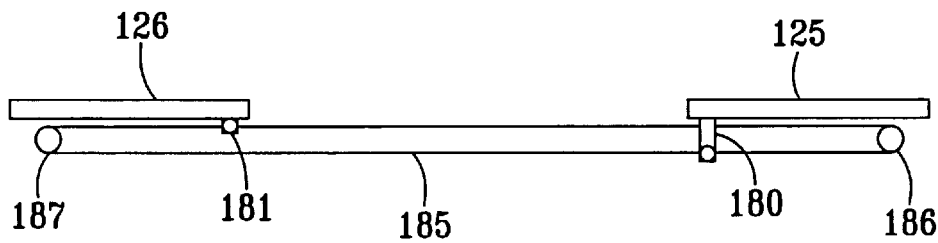
Figure 3D:
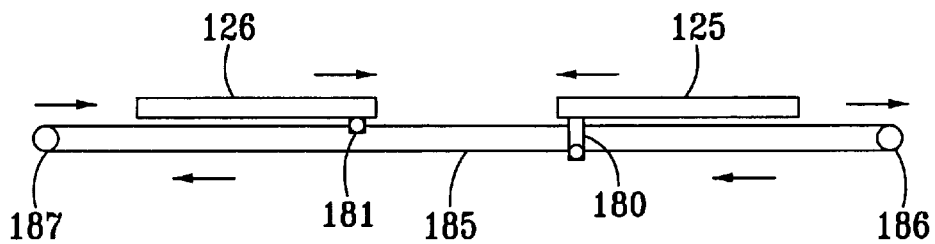

FIG. 3B depicts the situation where the pulley 185 is turning in a counter-clockwise direction, and the doors 125, 126 are in motion, in a partially open position. FIG. 3C depicts the situation where the pulley 185 has stopped moving, and the doors 125, 126 are at rest in the fully open position. FIG. 3D depicts the situation where the pulley 185 is turning in a clockwise direction, and the doors 125, 126 are in motion, again in a partially open position, but shutting.

Assuming a brushless DC servo motor is used as the door motor 230 for opening and closing the doors 125, 126, control of the door motor 230 by the controller 225 is accomplished in part using inputs from a set of optical sensors 205 which assist in detecting the current position of the doors 125, 126. In accordance with a preferred embodiment, FIG. 4 depicts placement of a set of optical detectors (in this example, four optical detectors 305, 306, 307 and 308) which assist in detecting the position of the doors 125, 126. Since the position of the left door 126 and right door 125 is symmetrical, optical detectors are only needed above one of the two doors 125, 126; however, it is also possible to have optical detectors above both doors 125, 126, or to split some of the optical detectors so that one or more are above each of the two doors 125, 126.

Optical detectors 305, 306, 307 and 308 may each comprise a IR emitter and IR sensor in a single integrated unit. In operation, the IR emitter of the optical detectors 305, 306, 307 or 308 emits IR energy, and measures the return energy using the IR sensor. The top of each door 125, 126 comprises a generally reflective surface, and when a portion of the top of the right door 125 is underneath an optical detector 305, 306, 307 or 308, then the respective optical detector 305, 306, 307 or 308 will detect the reflective surface of the top of the door 125 and thus detect that the door 125 is beneath the particular optical detector 305, 306, 307 or 308. By combining data from multiple optical detectors 305, 306, 307 and 308, the controller 225 can determine the current position of the door 125 to within a certain general tolerance—i.e., fully open, fully closed, nearly open, nearly closed, or partly open/closed. A variety of other alternative mechanisms may be used to provide to position information for the doors 125, 126, such as, for example, an optical reader placed above the door 125 (or 126) that reads special markings indicative of door position placed along the top edge of the door, or a distance detector placed on the inner sidewall of one or the doors that uses a radar or any other conventional technique to measure the distance to the opposing door. Using optical detectors 305, 306, 307 and 308 is presently preferred because of the relative small number of components needed, and the fact that the information returned is binary (i.e., door present or not present) which requires no decoding or further interpretation, thus simplifying the design.

If two or more of the optical detectors 305, 306, 307 and 308 are active at the same time, then it is assumed that too much ambient light is present, and a sensor failure condition is declared. Such a condition may occur, for example, when the shroud 149 (see FIG. 1) is off, which may cause saturation of the optical detectors 305, 306, 307 and 308. Generally, removal of the shroud 149 causes a much higher ambient light level then when the doors 125, 126 (or 425, 426) are simply open. Thus, the sensitivity of the optical detectors 305, 306, 307 and 308 is preferably set so that the opening of the doors 125, 126 (or 425, 426) does not, by itself, cause saturation, so long as the shroud 149 is in place. The sensor failure condition may be cleared when the condition causing it is removed (e.g., the shroud 149 is replaced).

Assuming the motor 230 comprises a brushless DC servo motor (such as a NEMA 34 brushless DC servo motor having, for example, 10.6 in-lbs continuous motive force and peak of 46 in-lbs), the motor speed control 228 (an example of which is depicted in mechanical form as motor drive 176 in FIGS. 14 and 15, for example) preferably comprises a 4-quadrant brushless DC motor drive having four modes of operation: (1) forward; (2) forward, decelerate; (3) backward; and (4) backward, decelerate. In operation, when the controller 225 determines that the doors 125, 126 should open, the controller 225 first checks data from the optical detectors 305, 306, 307 and 308 to determine whether the doors 125, 126 are already open. If none of optical detectors 305, 306 and 307 indicate the presence of the right door 125 underneath them, then the door 125 is assumed to be open, and the motor 230 is not energized. Typically, however, the doors 125, 126 will be in the shut position, and controller 225 will thus issue commands to the motor speed control 228 (i.e., motor drive) to open the doors 125, 126.

Controller 225 starts opening the doors 125, 126 by instructing the motor speed control 228 to place the motor 230 in operational mode of "forward". Until the right door 125 reaches optical sensor 307, the "forward" mode is maintained. Once the right door 125 reaches and passes optical sensor 307, which acts as a deceleration indicator, the controller 225 instructs the motor speed control 228 to place the motor 230 in operational mode of "forward, decelerate". The doors 125, 126 then decelerate. When the right door 125 reaches optical detector 308, which indicates a maximum open position of the doors 125, 126, the controller 225 instructs the motor speed control 228 to turn off the motor 230, and the right door 125 reaches a resting point at or just beyond optical detector 308, depending how far its final inertia takes it.

Optical detectors 305 and 306 are not necessary in the opening of the doors 125, 126. However, they are utilized in an analogous manner to optical detectors 307, 308, but for the closing process. Thus, when the controller 225 determines that the doors 125, 126 should be closed, the controller 225 instructs the motor drive 228 to place the motor 230 in an operational mode of "backward". In response, the doors 125, 126 begin to close. The doors 125, 126 continue to close until the right door 125 reaches and passes optical detector 306, at which point the controller 225 instructs the motor speed control 228 to place the motor 230 in an operational mode of "backward, decelerate". The doors 125, 126 begin to slow down their motion, and when the right door 125 reaches the optical detector 305, the controller 225 instructs the motor speed control 228 to turn off the motor 230. The doors 125, 126 then gradually come to rest in a closed position. Preferably, one of the two doors 125, 126 has a magnetic gasket (not shown) along its sidewall portion, while the other has a magnetic strip along its sidewall portion, such that the magnetic gasket and magnetic strip face one another and pull the doors 125, 126 together snugly as they reach their final resting, closed position.

The precise positions of optical detectors 305, 306, 307 and 308 may be determined empirically through routine experimentation, and may vary depending upon the size and weight of the doors 125, 126 (which contribute to their inertial energy) as well as the width of the doorway. In one embodiment, the optical detectors 306, 307 used as deceleration indicators are placed approximately six inches from the fully closed position and fully open position, respectively.

In general, doors 125, 126 open relatively quickly and close relatively slowly, based upon selection of the characteristics of the motor 230. Should one or more of the optical detectors 305 or 306 fail, the closing action of the doors 125, 126 does not present a dangerous situation because, with a brushless DC servo motor as the motor mechanism, the doors 125, 126 can be impeded by hand. Preferably, the controller 225 has a timeout feature such that, if the doors 125, 126 are impeded for a pre-programmed amount of time (e.g., 4 seconds), the controller 225 commands the motor 230 to be stopped. The pre-programmed time can be measured from when the right door 125 passes certain reference points—i.e., the positions of optical detectors 305, 306, 307 and/or 308.

Further, if there is failure by the sensors (such as sensor units 402 or 403 shown in FIG. 7 or 8), the doors 125, 126 can be opened manually, from the inside or outside. The magnetic gasket and seal on the inner sidewalls of the doors 125, 126 help keep the doors 125, 126 sealed when closed, but do not prevent manual opening of the doors 125, 126. Further, the doors 125, 126 can be manually opened if there is a power failure, with the roller mechanism of the doors 125, 126 providing easy sideways motion. With a gear-driven or non-brushless motor, on the other hand, the doors 125, 126 may be difficult to open manually, even when there is a failure by the sensors (e.g., sensor units 402, 403 shown in FIG. 7 or 8). The ability to open the doors 125, 126 manually under a variety of conditions is a significant safety feature, as the automatic sliding door system is intended in certain embodiments to be deployed in a walk-in freezer or refrigerator unit environment. If the doors 125, 126 cannot be opened manually, particularly from the inside, upon certain sensor or motor failure conditions, then an unnecessary risk is posed to persons entering the walk-in freezer or refrigerator unit.

Besides the aforementioned safety features, a number of further advantages may accrue by employing the brushless DC servo motor and the motor drive control as described above. First, no motor brushes, which are components subject to gradual deterioration, are required. Second, a gear reducer may not be necessary (although a gear reducer may, if desired, be used in some applications to balance the ratio of inertia between the motor and the door load). Third, the brushless DC servo motor has a minimum of moving parts, lessening the chance for mechanical breakdown. Fourth, deceleration of the doors 125, 126 is accomplished in the above-described embodiment without the need for dynamic braking, which generally requires a high motor RPM in order to work. Fifth, the controller 225 can control the opening and closing of the doors 125, 126 simply with only a relatively small set of optical detectors 305, 306, 307 and 308, and does not require complicated feedback control, nor does it need to derive velocity or acceleration measurements of the doors 125, 126 to control them.

FIGS. 14 and 15 depict further details of a preferred sliding door control mechanism, including, among other things, a preferred configuration of the pulley 185 and pulley wheels 186, 187, as well as electrical enclosure 175, a programmable logic circuit 561 (such as controller 225 in FIG. 2), motor drive 176, and power supply 560. Further appearing in FIG. 15 are a first pair of roller brackets 620, 680, which are fastened to the right door 125 to allow it to roll open and closed along a track 611, and a second pair of roller brackets 681, 690, which are fastened to the left door 126 to allow it to roll open and closed along track 611.

Figure 16:
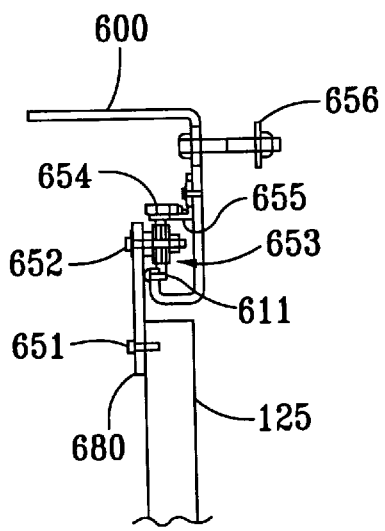
FIGS. 16–20 are detail diagrams taken along various sectional lines in FIG. 15.

Roller brackets 680, 681 are non-coupling, and are located at opposite ends of the door mechanism frame 600. FIG. 16 shows details of one roller bracket 680 as viewed along the cross-sectional lines A—A in FIG. 15. As shown in FIG. 16, the roller bracket 680 is fastened to the right door 125 using a stainless steel screw 651, and comprises a roller wheel 653 connected to the roller bracket member using a stainless steel screw 652. An aluminum angle 655 provides a top surface for roller wheel 653 to traverse when the door 125 opens or closes, while track 611 provides a lower rolling surface for roller wheel 653. The roller wheel 653 is preferably grooved so as to remain securely on the track 611. The track 611 is connected to the door mechanism frame 600, which is secured to the door frame using, for example, 2½" stainless steel bolts 656 (one of which is shown in FIG. 16). An optical detector 654 is shown positioned above the aluminum angle 655.

Figure 17:
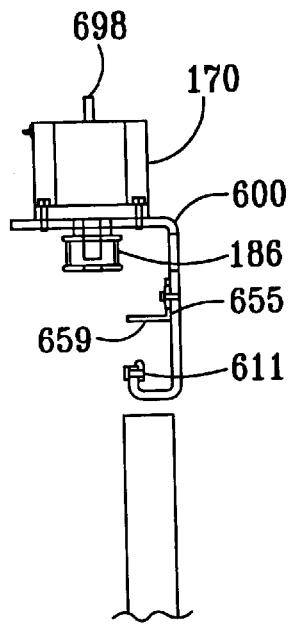
Figure 20:
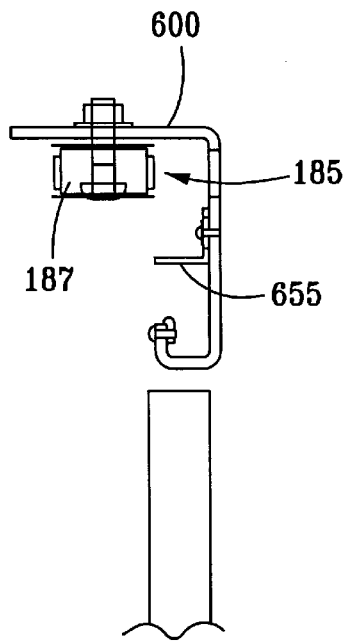

FIG. 17 shows details of the pulley mechanism as viewed along the cross-sectional lines B—B in FIG. 15, while FIG. 20 shows details of the pulley mechanism as viewed along the cross-sectional lines E—E in FIG. 15. As shown in FIG. 17, pulley wheel 186 is positioned underneath an angled portion of the door mechanism frame 600, beneath the motor 170. A central flange 698 in the motor 170 rotates the pulley wheel 186 and causes the pulley 185 to turn. Also shown in FIG. 17 is the aluminum angle 655 and track 611, which provide the means for the various roller wheels to travel when the doors 125, 126 open and close. Pressure sensitive wear tape 659 may be affixed to the lower surface of the aluminum angle 655 to improve the grip of the roller wheels. FIG. 20 shows a similar arrangement, but for pulley wheel 186.

Figure 18:
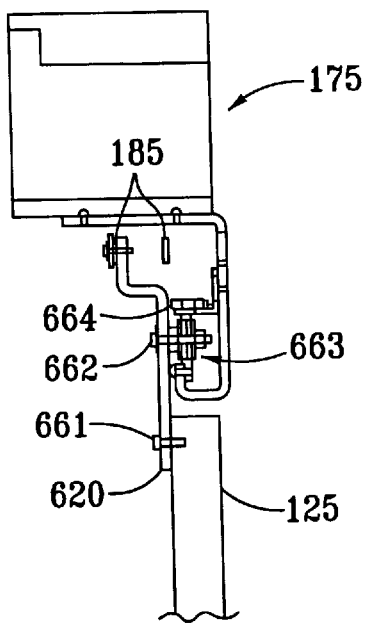

FIG. 18 shows details of right door roller bracket 620 as viewed along the cross-sectional lines C—C in FIG. 15. As shown in FIG. 18, the right door roller bracket 620 is curved so that it can be fastened to the outer band of pulley 185. The right door 125 is fastened to the right door roller bracket 620 with, e.g., a stainless steel screw 661. The right door roller bracket 620 further comprises a grooved roller wheel 663, which travels between the aluminum angle 655 and the track 611. An optical detector 664 is also shown above the aluminum angle 655. Atop the door mechanism frame 600 is shown the cross-sectional of the electronics enclosure 175.

Figure 19:
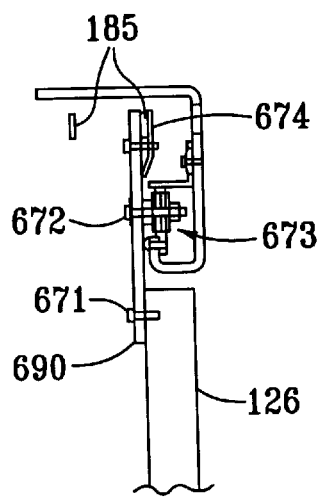

FIG. 19 shows details of left door roller bracket 690 as viewed along the cross-sectional lines D—D in FIG. 15. As shown in FIG. 19, the left door roller bracket 690 is straight so that it can be fastened to the inner band of pulley 185, using, for example, a coupling plate 674 and pem nut. The left door 126 is fastened to the left door roller bracket 690 with, e.g., a stainless steel screw 671. The left door roller bracket 690 further comprises a grooved roller wheel 673, which travels between the aluminum angle 655 and the track 611.

Figure 21:
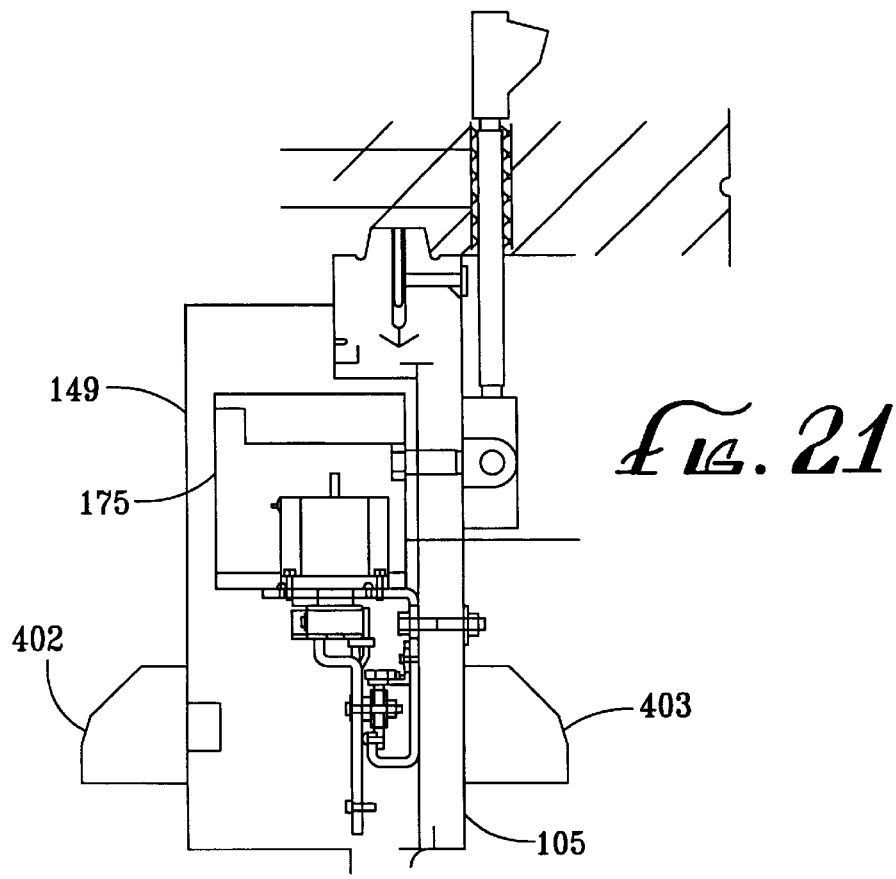
FIG. 21 is a cross-sectional view of the door mechanism frame shown in FIGS. 14 and 15 with mounted components.

FIG. 21 is a cross-sectional view of the door mechanism frame shown in FIGS. 14 and 15 with mounted components. Shown in FIG. 21 are, among other things, shroud 149 covering the electrical enclosure 175, and sensing units 402 and 403 shown in their relative positions (and which also depicted in the embodiment of FIG. 4).

While various components of the automatic sliding door system are described above, and in other places herein, as being constructed of particular materials (e.g., stainless steel, nylon, etc.), it will be appreciated that such components may be constructed of any suitable material, including various other metals, plastics, or other materials.

Some additional details of the construction of doors 125, 126 and door frame 105 will now be described with reference to FIGS. 12A–12C and 13A–13C. FIGS. 12A–12C are different sectional views of one door frame member (in this example, the right side door frame member), illustrating the relative positions of certain mounted components. FIG. 12A shows a cross-section of the shroud 149 placed across the top of the door frame 105, with the exterior sensor unit 402 and interior sensor unit 403 above the doorway. Within the shroud 149 is depicted the electronics enclosure 175, and the motor 170. FIG. 12B illustrates a cross-sectional of the door frame member at mid-region, while FIG. 12C illustrates a cross-sectional of the door frame 105 beyond the right door 125, showing boxes for exterior light switch 110 and interior illuminated light switch 115.

FIGS. 13A–13C are diagrams of views from the front, side and rear, respectively, showing further details of one side door (in this example, the left door 126) of a bi-parting, automatic sliding door, in accordance with an exemplary embodiment as described herein. The door 126 has a multi-paned window 121 surrounded by inner and outer window frames 554, which may be secured, for example, by stainless steel screws 556. The door 126 also may be provided with a front kickplate 104. A door guide angle and rail 549 at the bottom of the door 126 helps to keep the door stable and tracked when it opens and closes.

The electronics enclosure 175, motor 170, pulley 185 and associated mechanisms are preferably located on the exterior of the walk-in freezer or refrigerator unit so as to avoid problems that might otherwise occur due to extreme cold temperatures inside the freezer or refrigerator unit. As further protection against the extreme cold temperatures, the door frame panels 500, 502 (see FIG. 10A), although preferably stainless steel plated, are preferably insulated using urethane foam of appropriate thickness (e.g., 1½ inches thick). The door frame panels 500, 501 are preferably heated underneath the exterior stainless steel plating using an electric grid (of, e.g., 8 $\Omega$/ft.), thus preventing the coldness from reaching the exterior, preventing the doors 125, 126 from becoming excessively cold to the touch, and preventing condensation on the doors 125, 126. Further, the windows 120, 121 are preferably multi-paned, and are preferably heated using clear conductive film across the windows 120, 121, to which electrical wires are connected to provide electrical current for heating the windows 120, 121.

Besides the various safety and other features described above, additional features may be provided in various embodiments as described herein. An interior push plate 140 (in FIG. 1) or 440 (in FIG. 4) may be provided to allow manual opening of the doors 125, 126 (or 425, 426) in case of failure of the sensor units (e.g., 402 or 403). As shown in block diagram of the sensing and control system 200 in FIG. 2, the controller 230 receives an input signal from the push plate push plate 219, and can respond thereto be instructing the motor 230 to cause the doors 125, 126 (or 425, 426) to open. The push plate 140 or 440 is preferably "live" at all times, and is illuminated (by an LED, for example) to make it easily visible.

Also, a key lock 135 (in FIG. 1) or 435 (in FIG. 4) is preferably provided to control certain features of the doors 125, 126 (FIG. 1) or 425, 426 (FIG. 4). In a preferred embodiment, the key lock 135 or 435 comprises a 3-position key switch, the three positions corresponding to: (1) "closed and locked," wherein the outer sensor unit 402 is disabled so that persons cannot gain entry to the walk-in freezer or refrigerator unit 490 from the outside; (2) "automatic," wherein normal, active operation of sensor units 402, 403 occurs as previously described herein; and (3) "open and stay free (motor off)," wherein the doors can be manually opened and closed but are not able to be automatically opened and closed. In the "closed and locked" position, the inner sensor unit 403 remains active, so that persons who may happen to be trapped or still within the walk-in freezer or refrigerator unit 490 will be let out through automated operation of the doors 425, 426.

A padlock can be added to the outside of the doors, if desired. Preferably, the padlock bolt can be disengaged from the inside (by unscrewing it, for example), to prevent persons from becoming trapped inside the walk-in freezer or refrigerator unit 490.

Further, an alarm 231 is preferably included as part of the sensor and control system 200 (see FIG. 2) as part of the safety features provided by the automatic sliding door system. The alarm 231 is preferably acoustical in nature, but may also take the form of, for example, an LED (flashing or non-flashing), and may be configured to provide an alarm signal to a remote station or security booth to provide remote monitoring of the automatic sliding door. In a preferred embodiment, a multi-tiered alarm structure, with different alarm stages, is provided. An exemplary three-tiered alarm structure is described below, but a variety of different alarm system structures may be utilized, depending upon the particular application.

In an exemplary embodiment, the particular stage (i.e., type) of alarm is indicated by the number of audible chirps. Thus, a first stage (Type I) alarm is indicated by one chirp per second by the alarm 231, a second stage (Type II) alarm is indicated by two chirps per second by the alarm 231, and so on. In one embodiment, described with reference to the automatic sliding door system 401 shown in FIG. 4, a first stage (Type I) alarm indicates that the doors 425, 426 are jammed. In response to a first stage alarm condition, the controller 225 clears the alarm 231 once every thirty seconds (or other suitable time period) and attempts to close the doors 425, 426 again. If it fails to succeed, the first stage (Type I) alarm condition is set again.

A second stage (Type II) alarm indicates an optical sensor error due to, for example, the shroud 149 (see FIG. 1) being removed, thus causing saturation of the optical detectors 305, 306, 307 and 308. The controller 225 clears the second stage alarm condition every thirty seconds (or other suitable time period). The second stage alarm condition will remain cleared only when the condition causing the alarm is removed.

A third stage (Type III) alarm occurs when the doors 425, 426 have been locked but are then opened from the inside or outside. As soon as the doors 425, 426 are opened (as may be sensed, for example, by optical detector 305, or by a sensor on the inner sidewall of one of the doors), the front sensor 402 is re-activated, and the doors 425, 426 are driven open. The third stage alarm does not clear until a key is manually turned in the key lock 435 (although in certain embodiments it may be remotely cleared as well). The purpose of the third stage alarm is to prevent persons from illicitly gaining entry to the walk-in freezer or refrigerator unit 490 after the doors have been locked, by having forced the door open from the outside or by secretly having remained inside the freezer or refrigerator 490 after the doors have been locked.

An emergency override may be provided internal to the walk-in freezer or refrigerator unit 490 to silence the alarm, but the alarm condition remains until properly cleared. Thus, the owner or operator can determine that an alarm condition has occurred, even if the alarm has been silenced. In one embodiment, once the owner or operator returns and unlocks the doors 425, 426 using the key lock 435, the alarm re-activates and becomes audible once again.

Although preferred dimensions for a particular bi-parting sliding door 103 are shown in FIG. 1 and throughout others of the Figures provided herewith, it will be understood that the particular dimensions of an automatic sliding door and the related assemblies, mountings, control system components and other features depends entirely on the particular environment in which the door is placed. Accordingly, no limitation or restriction is intended or should be inferred by the inclusion of any particular dimensions for any particular components described herein or depicted in the Figures. Further, as mentioned previously herein, preferred materials (such as stainless steel, urethane, nylon, etc.) for constructing embodiments of an automatic sliding door and system have been described above, but the invention is not limited to systems constructed using any particular material types, and any suitable materials may be used.

Further, while preferred embodiments have been described with respect to examples of a bi-parting door, it should be recognized that many of the same principles may be applicable to a single sliding door for a refrigerator or freezer unit. For example, an automatic sliding door system comprising a single sliding door may be opened and closed according to inputs received from an exterior sensor unit and an interior sensor unit, and/or may be opened and closed using a similar pulley mechanism or a brushless DC servo motor, and/or may be configured with a multi-tier alarm system and a multi-position key lock as described previously herein.

While preferred embodiments of the invention have been described herein, many variations are possible which remain within the concept and scope of the invention. Such variations would become clear to one of ordinary skill in the art after inspection of the specification and the drawings. The invention therefore is not to be restricted except within the spirit and scope of any appended claims.

What is claimed is:

1. An automatic sliding door system, comprising:

an insulated door frame, adapted for placement between a walk-in freezer or refrigerator and the exterior thereof;

a bi-parting door connected to said insulated door frame, said bi-parting door comprising a right door and a left door, each slidably connected to said insulated door frame;

a motor for synchronously opening said right door and left door;

an exterior sensor unit mounted on said door frame, said exterior sensor unit comprising an exterior motion sensor and an exterior presence detector positioned so as to view in a downward grid from atop said insulated door frame;

an interior sensor unit mounted on said door frame, said interior sensor unit comprising an interior motion sensor and an interior presence detector positioned so as to view in a downward grid from atop said insulated door frame; and a controller electrically connected to said exterior sensor unit, said interior sensor unit, and said motor, said controller causing said motor to energize in response to a movement detection signal or a presence detection signal from either said exterior sensor unit or said interior sensor unit.

2. The automatic sliding door system of claim 1, wherein each of said exterior motion sensor and said interior motion sensor generates a motion detection signal only when detecting motion towards the bi-parting door, but thereafter continues to generate said motion detection signal until motion in any direction within a detection field of said exterior motion sensor or interior motion sensor, respectively, is no longer detected.

3. The automatic sliding door system of claim 1, wherein said motor comprises a brushless DC servo motor, wherein said insulated door frame comprises a left frame sidewall, a right frame sidewall, and a frame crossbeam, and wherein the automatic sliding door system further comprises:
   a track affixed to said frame crossbeam;
   a first pair of roller brackets connected to said right door, said roller brackets comprising rollers adapted for motion along said track whereby said right door slides open and shut;
   a second pair of roller brackets connected to said left door, said roller brackets comprising rollers adapted for motion along said track whereby said left door slides open and shut;
   a pair of pulley wheels affixed to said frame crossbeam, said brushless DC servo motor connected to one of said pulley wheels;
   a pulley securely wrapped around said pulley wheels, whereby rotation of said pulley wheels causes said pulley to rotate;
   a first extension connecting said right door to one side of said pulley and a second extension connecting said left door to another side of said pulley, whereby said brushless DC servo motor causes said right door and left door to open and shut in synchronicity when turning said one pulley wheel; and
   a plurality of optical detectors for detecting the presence of either said right door or said left door, each optical detector located at a different position along at least one of said right door and said left door, said optical detectors electrically connected to said controller, whereby said controller determines when to energize, decelerate and stop said motor.

4. The automatic sliding door system of claim 1, further comprising an alarm connected to said controller, wherein said controller causes said alarm to produce different alarm signals based upon different alarm conditions.

5. The automatic sliding door of claim 4, wherein said controller causes said alarm to produce a first alarm signal when said right door or left door is jammed, a second alarm signal upon occurrence of an error relating to said optical detectors, and a third alarm signal when said bi-parting door is manually opened or movement is detected by said interior motion sensor within said walk-in freezer or refrigerator after said bi-parting door has been locked.

6. The automatic sliding door system of claim 3,
   wherein said plurality of optical detectors comprise a first optical detector positioned at a deceleration point for opening said right door and left door, a second optical detector positioned at an at-rest point when said right door and left door are fully open, a third optical detector positioned at a deceleration point for closing said right door and left door, and a fourth optical detector positioned at an at-rest point when said right door and left door are fully closed, each optical detector providing an electrical signal to said controller indicating whether said at least one door is present or not present in its detection field; and
   wherein said controller causes said motor to decelerate when said at least one door reaches either said first optical detector or said third optical detector, and to stop when said at least one door reaches either said second optical detector or said fourth optical detector.

7. The automatic sliding door system of claim 1, further comprising manual activation means located internally to said walk-in freezer or refrigerator for causing said controller to energize said motor so as to open said bi-parting door.

8. The automatic sliding door system of claim 1, wherein said exterior presence detector and said interior presence detector each comprises an infrared (IR) pattern generator and an infrared sensor.

9. The automatic sliding door system of claim 8, wherein said IR pattern generator comprises a plurality of infrared light-emitting diodes (LEDs) which are configured to emit infrared energy in a grid-shaped pattern.

10. The automatic sliding door system of claim 8, wherein said exterior presence detector and said interior presence detector each automatically relearns the ambient environmental conditions within its respective sensing field at preset intervals, such that the presence detector will not thereafter issue a presence detection signal to cause the opening of the bi-parting door unless the ambient environmental conditions change.

11. The automatic sliding door system of claim 10, wherein said exterior presence detector and said interior presence detector each memorizes a reflectivity pattern within its respective sensing field, and thereafter issue a presence detection signal to open the bi-parting door when a sensed reflectivity pattern later fails to match the memorized reflectivity pattern.

12. The automatic sliding door system of claim 11, wherein said exterior presence detector and interior presence detector automatically memorizes the reflectivity pattern within its respective sensing field each time the bi-parting door is opened.

13. The automatic sliding door system of claim 12, wherein the exterior presence detector and interior presence detector changes its memorized reflectivity pattern after continuously detecting an obstruction for a programmable time period.

14. An automatic sliding door system, comprising:
   an insulated door frame, adapted for placement between a walk-in freezer or refrigerator and the exterior thereof, said insulated door frame comprising a left frame sidewall, a right frame sidewall, and a frame crossbeam;
   a track affixed to said frame crossbeam;
   a right door;
   a first pair of roller brackets connected to said right door, said roller brackets comprising rollers adapted for motion along said track whereby said right door slides open and shut;
   a left door;
   a second pair of roller brackets connected to said left door, said roller brackets comprising rollers adapted for motion along said track whereby said left door slides open and shut;
   a pair of pulley wheels affixed to said frame crossbeam;
   a pulley securely wrapped around said pulley wheels, whereby rotation of said pulley wheels causes said pulley to rotate;
   a first extension connecting said right door to one side of said pulley;
   a second extension connecting said left door to another side of said pulley;
   a brushless DC servo motor connected to one of said pulley wheels, whereby said right door and left door are open and shut in synchronicity when said brushless DC servo motor turns said one pulley wheel;

a controller electrically connected to said brushless DC servo motor; and a plurality of optical detectors for detecting the presence of either said right door or said left door, each optical detector located at a different position along at least one of said right door and said left door, said optical detectors electrically connected to said controller, whereby said controller determines when to energize, decelerate and stop said brushless DC servo motor.

15. The automatic sliding door system of claim 14, wherein said plurality of optical detectors comprises a first optical detector positioned at a deceleration point for opening said right door and left door, a second optical detector positioned at an at-rest point when said right door and left door are fully open, a third optical detector positioned at a deceleration point for closing said right door and left door, and a fourth optical detector positioned at an at-rest point when said right door and left door are fully closed, each optical detector providing an electrical signal to said controller indicating whether said at least one door is present or not present in its detection field; and wherein said controller causes said brushless DC servo motor to decelerate when said at least one door reaches either said first optical detector or said third optical detector, and to stop when said at least one door reaches either said second optical detector or said fourth optical detector.

16. The automatic sliding door system of claim 14, further comprising:

an exterior sensor unit mounted on said door frame, said exterior sensor unit comprising an exterior motion sensor and an exterior presence detector positioned so as to view in a downward grid from atop said insulated door frame; and an interior sensor unit mounted on said door frame, said interior sensor unit comprising an interior motion sensor and an interior presence detector positioned so as to view in a downward grid from atop said insulated door frame;

wherein said controller is electrically connected to said exterior sensor unit and to said interior sensor unit, said controller causing said motor to energize in response to a movement detection signal or a presence detection signal from either said exterior sensor unit or said interior sensor unit.

17. The automatic sliding door system of claim 16, wherein said exterior presence detector and said interior presence detector each comprises an infrared (IR) pattern generator and an infrared sensor.

18. The automatic sliding door system of claim 17, wherein said IR pattern generator comprises a plurality of infrared light-emitting diodes (LEDs) which are configured to emit infrared energy in a grid-shaped pattern.

19. The automatic sliding door system of claim 17, wherein said exterior presence detector and said interior presence detector each automatically relearns the ambient environmental conditions within its respective sensing field at preset intervals, such that the presence detector will not thereafter issue a presence detection signal to cause the opening of the bi-parting door unless the ambient environmental conditions change.

20. The automatic sliding door system of claim 19, wherein said exterior presence detector and said interior presence detector each memorizes a reflectivity pattern within its respective sensing field, and thereafter issue a presence detection signal to open the bi-parting door when a sensed reflectivity pattern later fails to match the memorized reflectivity pattern.

21. The automatic sliding door system of claim 20, wherein said exterior presence detector and interior presence detector automatically memorizes the reflectivity pattern within its respective sensing field each time the bi-parting door is opened.

22. The automatic sliding door system of claim 21, wherein the exterior presence detector and interior presence detector changes its memorized reflectivity pattern after continuously detecting an obstruction for a programmable time period.

23. An automatic sliding door system for use in a walk-in freezer or refrigerator, comprising:

an insulated door frame, adapted for placement between a walk-in freezer or refrigerator and the exterior thereof, said insulated door frame comprising a left frame sidewall, a right frame sidewall, and a frame crossbeam;

a track affixed to said frame crossbeam;

a right door;

a first pair of roller brackets connected to said right door, said roller brackets comprising rollers adapted for motion along said track whereby said right door slides open and shut;

a left door;

a second pair of roller brackets connected to said left door, said roller brackets comprising rollers adapted for motion along said track whereby said left door slides open and shut;

an exterior sensor unit mounted atop said frame crossbeam, said exterior sensor unit comprising an exterior motion sensor and an exterior presence detector, said exterior presence detector forming a first infrared detection grid downward beneath said frame crossbeam and at least partly internal to said walk-in freezer or refrigerator;

an interior sensor unit mounted atop said frame crossbeam, said interior sensor unit comprising an interior motion sensor and an interior presence detector, said interior presence detector forming a second infrared detection grid downward beneath said frame crossbeam and at least partly external to said walk-in freezer or refrigerator;

a pair of pulley wheels affixed to said frame crossbeam;

a pulley securely wrapped around said pulley wheels, whereby rotation of said pulley wheels causes said pulley to rotate;

a first extension connecting said right door to one side of said pulley;

a second extension connecting said left door to another side of said pulley;

a brushless DC servo motor connected to one of said pulley wheels;

a controller electrically connected to said exterior sensor unit and to said interior sensor unit, said controller energizing said brushless DC servo motor upon detection by said exterior sensor unit or said interior unit of either movement within a field of view of said exterior motion detector or said interior motion detector, or a presence within said first infrared detection grid or said second infrared detection grid; and a plurality of optical detectors for detecting the presence of either said right door or said left door each optical detector located at a different position along at least one of said right door and said left door, said optical detectors electrically connected to said controller, whereby said controller determines when to energize, decelerate and stop said brushless DC servo motor.

24. The automatic sliding door system of claim 23, wherein said exterior presence detector and said interior presence detector each comprises an infrared (IR) pattern generator and an infrared sensor.

25. The automatic sliding door system of claim 24, wherein said IR pattern generator comprises a plurality of infrared light-emitting diodes (LEDs) which are configured to emit infrared energy in a grid-shaped pattern.

26. The automatic sliding door system of claim 24, wherein said exterior presence detector and said interior presence detector each automatically relearns the ambient environmental conditions within its respective sensing field at preset intervals, such that the presence detector will not thereafter issue a presence detection signal to cause the opening of the bi-parting door unless the ambient environmental conditions change.

27. The automatic sliding door system of claim 26, wherein said exterior presence detector and said interior presence detector each memorizes a reflectivity pattern within its respective sensing field, and thereafter issue a presence detection signal to open the bi-parting door when a sensed reflectivity pattern later fails to match the memorized reflectivity pattern.

28. The automatic sliding door system of claim 27, wherein said exterior presence detector and interior presence detector automatically memorizes the reflectivity pattern within its respective sensing field each time the bi-parting door is opened.

29. The automatic sliding door system of claim 28, wherein the exterior presence detector and interior presence detector changes its memorized reflectivity pattern after continuously detecting an obstruction for a programmable time period.

30. The automatic sliding door system of claim 23, wherein said plurality of optical detectors comprise a first optical detector positioned at a deceleration point for opening said right door and left door, a second optical detector positioned at an at-rest point when said right door and left door are fully open, a third optical detector positioned at a deceleration point for closing said right door and left door, and a fourth optical detector positioned at an at-rest point when said right door and left door are fully closed, each optical detector providing an electrical signal to said controller indicating whether said at least one door is present or not present in its detection field; and wherein said controller causes said brushless DC servo motor to decelerate when said at least one door reaches either said first optical detector or said third optical detector, and to stop when said at least one door reaches either said second optical detector or said fourth optical detector.

* * * * *